United States Patent [19]

Sugano et al.

[11] Patent Number: 4,865,249
[45] Date of Patent: Sep. 12, 1989

[54] SAFETY DEVICE

[75] Inventors: Mitsutoshi Sugano, Tomioka; Toshiya Uchida, Sano; Shigeru Tokita, Shimotsuga; Atsuhiko Kaneaki, Sano; Shigeho Shimada, Tochigi, all of Japan

[73] Assignee: Nihon Radiator Co., Ltd., Tokyo, Japan

[21] Appl. No.: 90,746

[22] Filed: Aug. 28, 1987

[30] Foreign Application Priority Data

Sep. 22, 1986 [JP] Japan .............................. 61-144029[U]

[51] Int. Cl.⁴ ............................................. G05D 27/00
[52] U.S. Cl. ............................ 236/92 C; 237/12.3 B; 123/41.15
[58] Field of Search ............. 236/92 C, 61; 237/12 A, 237/12 B; 123/41.15

[56] References Cited

U.S. PATENT DOCUMENTS 2,535,974  12/1950  Watkins, Jr. ..................... 236/92 C
2,747,802  5/1956   Kmiecik ............................ 236/92 C
4,605,164  8/1986   Hayashi et al. ............. 237/12.3 B X

FOREIGN PATENT DOCUMENTS

60-122208  8/1985  Japan .

*Primary Examiner*—Harry B. Tanner
*Attorney, Agent, or Firm*—Burns, Doane, Swecker & Mathis

[57] ABSTRACT

A safety device for an engine cooling system having a heater core circuit for circulating the engine cooling water through the heater core of an automotive air conditioning system, and a radiator circuit for circulating the engine cooling water through a radiator. The safety device comprises a safety valve provided in the heater core circuit and capable of discharging the engine cooling water outside the vehicle when the temperature of the engine cooling water exceeds a predetermined temperature and/or when the pressure of the engine cooling water exceeds a predetermined pressure.

11 Claims, 7 Drawing Sheets

SAFETY DEVICE

BACKGROUND OF THE INVENTION

1. Field of the Invention

The present invention relates to a safety device for an automotive air conditioning system using engine cooling water as heat source for air conditioning the passengers' compartment of an automobile, capable of discharging the engine cooling water when the temperature of the engine cooling water exceeds a predetermined temperature level or when the pressure of the engine cooling water exceeds a predetermined pressure level.

2. Description of the Prior Art

Figure 14:
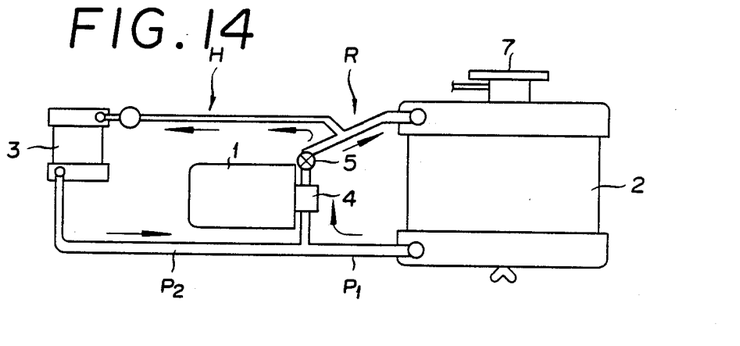
FIG. 14 is a diagrammatic illustration of a conventional engine cooling system.

Generally, an automotive air conditioning system uses engine cooling water as heat source for air conditioning the passengers' compartment of an automobile. As shown in FIG. 14, the water cooling system for cooling the engine is a closed circuit formed by interconnecting the water jacket of an engine 1, a radiator 2 and a heater core 3 by pipes $P_1$ and $P_2$. The engine cooling water in the pipes $P_1$ and $P_2$ is urged by a water pump 4 which is driven by the engine 1 so as to flow through the radiator 2 and the heater core 3 in order to cool the engine 1 and to air-condition the passengers' compartment. (Refer to Japanese Utility Model Laid-Open No. 60-122,208).

Accordingly, the engine cooling water circulates through a radiator circuit R formed by interconnecting the radiator 2 and the engine 1 by the pipe $P_1$ and through a heater core circuit H formed by interconnecting the heater core 3 serving as a heat source of the automotive air conditioning system and the engine 1 by the pipe $P_2$.

The flow rate of the engine cooling water circulating through the radiator circuit R is regulated by a thermostat 5 which regulates the cross-sectional area of the flow passage of the radiator circuit R. The flow rate of the engine cooling water circulating through the heater core circuit H is regulated by means of a water cock 6 provided near the heater core 3 in the heater core circuit H. When the temperature of the engine cooling water circulating through the radiator circuit R exceeds a predetermined temperature level or when the pressure of the same exceeds a predetermined pressure level due to some cause, a safety valve (not shown) incorporated into the radiator cap 7 opens to discharge the engine cooling water from the radiator 2 so that the radiator circuit R is relieved of the high-temperature or high-pressure engine cooling water.

That is, although the water cooling system comprises the radiator circuit R and the heater core circuit H, the water cooling system is a single closed circuit as a whole, and hence the safety of the heater core circuit H can naturally be secured by relieving the radiator circuit R of the high-temperature or high-pressure engine cooling water by the safety valve provided in the radiator circuit R.

The safety valve incorporated into the radiator cap 7 functions according to the pressure of the engine cooling water.

In the winter season, it is possible that the radiator circuit R is clogged in the vicinity of the safety valve where the flow passage becomes narrow by the frozen engine cooling water or changing into the sherbet state. In such a clogged state, the safety valve is unable to function normally and the engine cooling water flows excessively through the heater core circuit H having a comparatively small flow capacity, and thereby it is possible that a portion having a low strength of the heater core circuit H is broken due to the flow of the engine cooling water of an abnormally high temperature or an abnormally high pressure through the heater core circuit H.

The breakage of the heater core circuit H causes the engine cooling water containing an antifreeze to leak into the passengers' compartment to soil the floor of the passengers' compartment.

The present invention has been made to eliminate the drawbacks of and to solve the problems of the conventional automotive water cooling system. Accordingly, it is a principal object of the present invention to protect the heater core circuit and the radiator circuit by, discharging the engine cooling water outside the passengers' compartment when the temperature of the engine cooling water flowing in the heater core circuit exceeds a predetermined temperature level or when the pressure of the same exceeds a predetermined pressure level.

It is a second object of the present invention to protect the water cooling system from damage when the safety valve incorporated into the radiator cap becomes inoperative.

It is a third object of the present invention to provide a safety valve capable of readily dealing with the variation of the boiling points and the rising mode of pressure of the engine cooling water containing an antifreeze.

SUMMARY OF THE INVENTION

The present invention provides a safety device for an engine cooling system comprising a heater core circuit for circulating the engine cooling water through the heater core of an automotive air conditioning system, and a radiator circuit for circulating the engine cooling water through a radiator provided with a safety valve, which comprises a safety valve provided in the heater core circuit to discharge the engine cooling water from the engine cooling system when the temperature of the engine cooling water exceeds a predetermined temperature and/or when the pressure of the same exceeds a predetermined pressure. When the condition of the engine cooling water circulating through the engine cooling system becomes abnormal, the safety valve discharges a portion of the engine cooling water outside the passengers' compartment to maintain the engine cooling water circulating through the engine cooling system always in a normal condition.

DETAILED DESCRIPTION OF THE PREFERRED EMBODIMENTS

The present invention will be described hereinafter with reference to the preferred embodiments.

Figure 1:
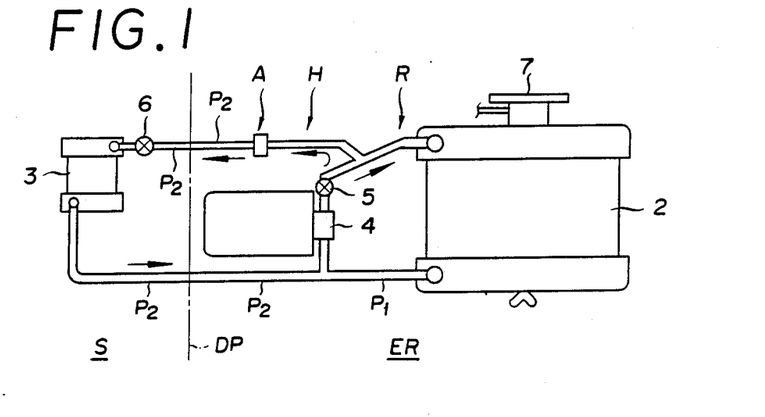
FIG. 1 is a diagrammatic illustration of an engine one embodiment of cooling system incorporating a safety device according to one embodiment of the present invention.

FIG. 1 is an overall diagrammatic illustration of one embodiment according to the present invention. The same parts as shown in FIG. 14 are indicated by the same reference numbers. An engine cooling system is disposed in an engine room ER and a passengers' compartment S which are partitioned by a dash panel DP. An engine 1 and a radiator 2 are disposed in the engine room ER. A heater core 3 included in the heater unit of an automotive air conditioning system is disposed in the passengers' compartment S.

A safety device according to the present invention comprises a safety valve A provided outside the passengers' compartment in a pipe $P_2$ of a heater core circuit H. When the temperature of the engine cooling water exceeds a predetermined temperature or when the pressure of the same exceeds a predetermined temperature, the safety valve discharges a portion of the engine cooling water into the engine room ER to maintain the engine cooling water always in a predetermined normal condition.

Figure 2A:
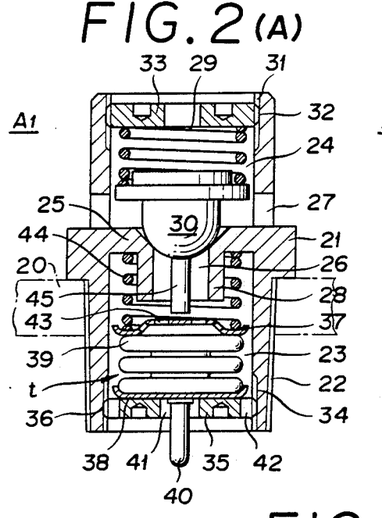
FIG. 2(A) is a longitudinal sectional view of a safety valve employed in the same embodiment of FIG. 1.

Referring to FIG. 2(A) showing a safety valve $A_1$ employed in a safety device, in a first embodiment, according to the present invention, a casing 21 is screwed in a cooling water flow passage 20, which corresponds to the pipe $P_2$ of the heater core circuit H with an external thread 22 provided in the casing 21.

The interior of the casing 21 is partitioned into a lower first chamber 23 and an upper second chamber 24 by a partition wall 25. The first chamber 23 communicates with the flow passage of the cooling water flow passage 20 and contains a heat-responsive actuator t, namely, a bellows 39 in this embodiment, for operating a valve element 30 according to the temperature of the engine cooling water. The first chamber 23 communicates with the second chamber 24 containing the valve element 30 by means of a through hole 26 formed through the partition wall 25. Discharge holes 27 are formed through the casing 21 so as to open into the second chamber 24.

A cylindrical projection 28 having a bore which is concentric with the through hole 26 projects from the partition wall 25 into the first chamber 23.

The valve element 30 provided in the second chamber 24 is biased resiliently by an upper coil spring 29 in a direction to close the through hole 26. When the pressure within the first chamber 23 exceeds a predetermined pressure, the valve element 30 is lifted against the resilience of the upper coil spring 29 to open the through hole 26.

An internal thread 31 and an internal thread 34 are formed in the upper end and in the lower end, as viewed in FIG. 2(A) of the casing 21.

The upper coil spring 29 has one end in contact with the valve element 30, and the other end in contact with an upper cap 33 provided with an external thread 32 and screwed in the upper end of the casing 21. The working resilience of the upper coil spring 29 is adjusted by turning the upper cap 33.

A lower cap 35 provided with an external thread 36 is screwed in the lower end of the casing 21. An upper end plate 37 made of a metal and a lower end plate 38 made of a metal are provided at the opposite ends, respectively, in the first chamber 23. The bellows 39 serving as the heat-responsive actuator t is provided between the upper end plate 37 and the lower end plate 38 for axial expansion and contraction. A hollow metallic heat sensing member 40 is attached to the lower end plate 38 so as to extend through a hole 41 formed in the lower cap 41 and to project into the cooling water flow passage 20. The interior of the bellows 39 and the interior of the heat sensing member 40 communicate with each other and are filled with a gas which varies in volume according to temperature, for example, Freon ® gas. The first chamber communicates with the flow passage by means of a plurality of holes 42 formed in the lower cap 35.

As shown in FIG. 2(A), a plurality of through holes 43 are formed in the upper end plate 37 to enable the first chamber 23 to communicate with the through hole 26 even when the upper end plate 37 is in contact with the lower end face of the cylindrical projection 28. A lower coil spring 44 is provided between the partition wall 25 and the upper end plate 37 of the bellows 39 an encircles the cylindrical projection 28 to bias the bellows 39 resiliently in a direction to make the bellows 39 contract. The resilience of the lower coil spring 44 can be adjusted by turning the lower cap 35.

The valve element 30 is provided with a rod 45, which projects from the cylindrical projection 28 when the valve element 30 is seated on the partition wall 25 to close the through hole 26.

The function of the safety device will be described hereinafter.

In a state shown in FIG. 2(A) the temperature and pressure of the cooling water in the flow passage are below a predetermined temperature and a predetermined pressure, respectively. In this state, the valve element 30 is seated on the partition wall 25 by the resilience of the upper coil spring 29 to close the through hole 26, and the bellows 39 is in a contracted state, so that the upper end plate 37 is separated from the lower end of the cylindrical projection 28. Accordingly, the engine cooling water flowing through the cooling water flow passage 20 does not flows outside.

Figure 2B:
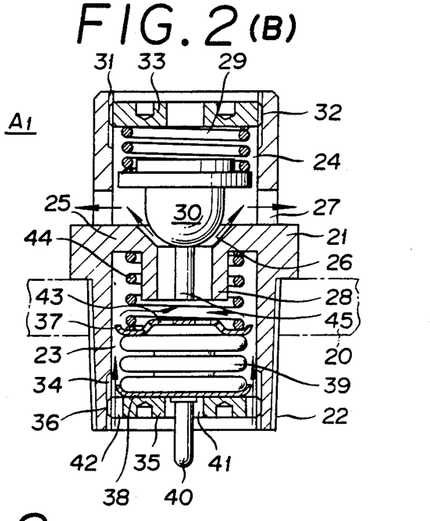
FIGS. 2(B) and 2(C) are longitudinal sectional views of the safety valve of FIG. 2(A) in different operating states.
Figure 3:
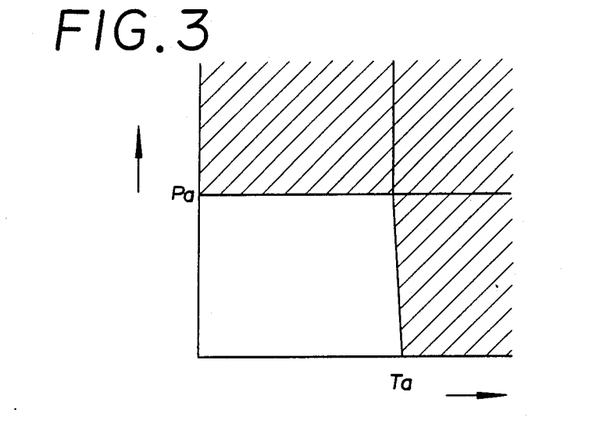
FIG. 3 is a diagram showing the operating range of the safety valve of FIG. 2(A)

When the pressure of the cooling water in the flow passage increases beyond a predetermined pressure Pa (FIG. 3), the valve element 30 is separated from the partition wall 25 to open the through hole 26 against the resilience of the upper coil spring 29 by the pressure of the cooling water (FIG. 2(B)). Consequently, the cooling water is discharged from the cooling water flow passage 20 through the through hole 26 and the discharge holes 27 into the engine room ER.

Figure 2C:
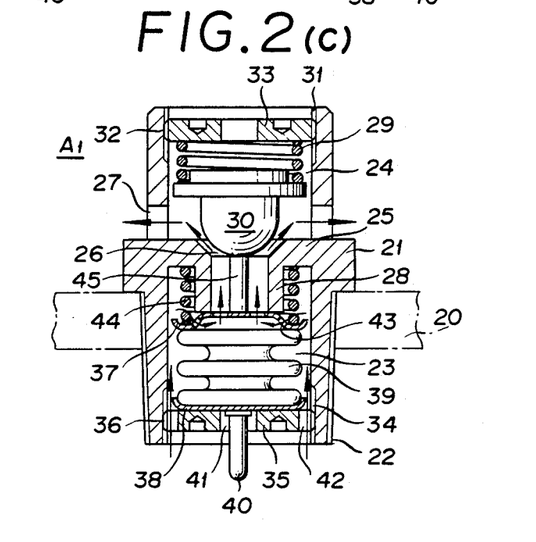

On the other hand, when the temperature of the cooling water in the cooling water flow passage 20 rises beyond a predetermined temperature Ta(FIG. 3), the pressure of the gas sealed in the bellows 39 increases to a pressure high enough to cause the bellows 39 to expand against the resilience of the lower coil spring 44. Consequently, the upper end plate 37 is brought into contact with the lower end of the rod 45 to separate the valve element 30 from the through hole 26, and thereby the engine cooling water is allowed to flow out through the through hole 26 and the discharge holes 27 into the engine room ER (FIG. 2(C)).

When the engine cooling water of a high temperature and/or a high pressure in the heater core circuit H is discharged in such a manner into the engine room ER, the temperature or pressure of the engine cooling water flowing through the cooling water flow passage 20 is reduced. Thus, the engine cooling water flowing through the heater core circuit H is maintained always in a predetermined condition even if the safety valve of the radiator cap should fail to function properly.

Thus, in the safety valve A, the valve element 30 opens the through hole 26 either when the temperature of the engine cooling water exceeds the predetermined temperature Ta or when the pressure of the same exceeds the predetermined pressure Pa. That is, the valve element 30 opens the through hole 26 when the condition of the engine cooling water is in the shaded area in FIG. 3.

Figure 4:
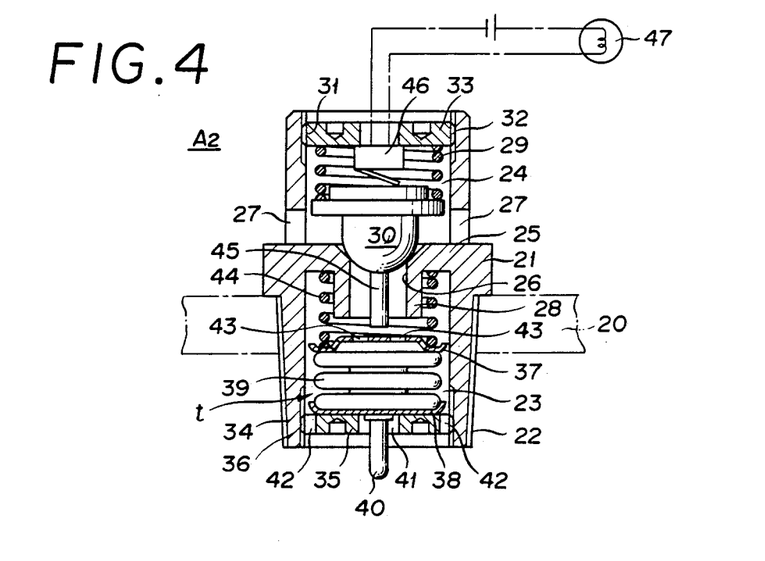
FIGS. 4, 5 and 6 are longitudinal sectional views of different safety valves employed in another embodiments of the present invention, respectively.

FIG. 4 illustrates a safety valve $A_2$ employed in a safety device, in an another embodiment, according to the present invention where the same symbol is indicated in the same part of the abovementioned embodiment. The safety valve $A_2$ is substantially the same as the safety valve $a_1$ in construction and function. The safety valve $A_2$ is provided with a switch 46, which is attached to the inner surface of an upper cap 33. When a valve element 30 is lifted up from a through hole 26 and approaches the upper cap 33, the switch 46 is actuated to light up an alarm clamp 47. The alarm lamp 47 may be substituted by a buzzer.

Figure 5:
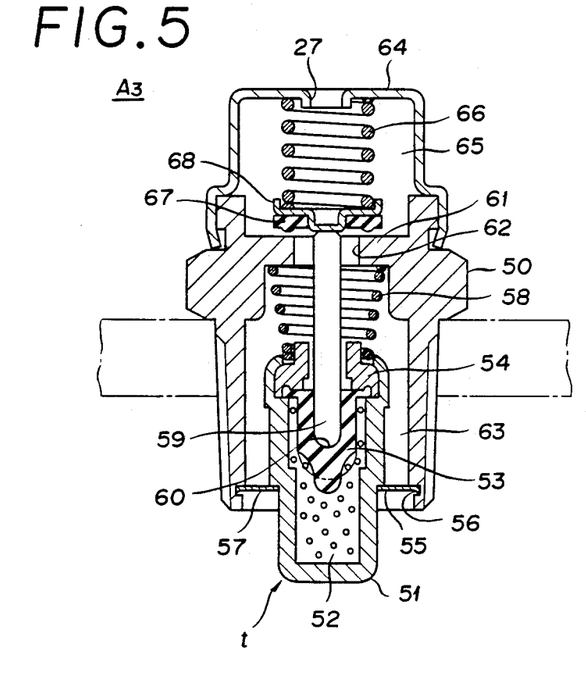

FIG. 5 illustrates a safety valve $A_3$ which operates, similarly to the safety valves $A_1$ and $A_2$, according to the level of the temperature or pressure of the engine cooling water. The safety valve $A_3$ is simpler than the safety valve $A_1$ (FIG. 2(A)) in construction. In the safety valve $A_3$, the heat-responsive actuator t comprises a tubular container 51 having a high thermal conductivity, and a wax 52 having a desired melting point and sealed in the tubular container 51. A rod 59 is moved axially according to the mode of transformation of the wax 52. The heat-responsive actuator t is provided in a first chamber 63 formed in a casing 50.

The heat-responsive actuator t is formed by sealing the wax 52 which is melted by heat and expands according to temperature in the tubular container 51, fitting an elastic member 53 having a U-shaped section made of an elastic material such as rubber in the upper end of the tubular container 51 to seal the wax 52 in the tubular container 51, covering the elastic member 53 with a cap 54, and caulking the upper end of the tubular container 51 to secure the cap 54. A supporting plate 57 is fitted in a groove 56 formed in the inner circumference of the lower end of the casing 50, and the tubular container 51 is supported on the supporting plate 57 with the shoulder 53 thereof in contact with the supporting plate 57, and is pressed resiliently against the supporting plate 57 by a coil spring 58.

A plurality of through holes are formed in the supporting plate 57 to allow the engine cooling water to flow into at flow out the fist chamber 63.

The rod 59 is inserted in the tubular container 51 so that the lower end of the rod 59 is in contact with the bottom 60 of a hole formed in the elastic member 53 to receive the rod 59 therein. The upper end of the rod 59 passes through a through hole 62 formed in a partition wall 61 and projects into a second chamber 63 from the partition wall 61.

A cap 64 is put on top of the casing 50. The cap 64 has the shape of a stepped cylinder and is provided with a discharge hole 27 at the center of the upper wall thereof. The cap 64 define the second chamber 65.

A valve element 67 formed of an elastic material such as rubber and attached to a valve disk 68 is placed in the second chamber 63. The valve disk 68 is biased by an upper coil spring 66 so as to be in contact with the upper end of the rod 59.

When the temperature of the engine cooling water exceeds a predetermined temperature Ta, the wax 52 melts and expands to make the elastic member 53 deform by pressure as illustrated, and thereby the valve element 67 is pushed up by the rod 59, so that the valve seat 65 is separated from the through hole 62 to open the same.

When the temperature of the engine cooling water is abnormally high, the pressure of the engine cooling water also is high. Accordingly, the engine cooling water flows through the first chamber 63 and the through hole 62 into the second chamber 65, and then flows through the discharge hole 27 outside the safety valve.

Ordinarily, the safety valve $A_3$ of this embodiment operates according to the temperature of the engine cooling water in the manner as stated above. However, the safety valve $A_3$ functions also when the pressure of the engine cooling water becomes abnormally high due to some cause even if the temperature of the cooling water is low.

In such a case, the high pressure of the engine cooling water in the first chamber 63 works directly on the valve element 67 to lift the valve element 67 against the resilient force of the upper coil spring 66, and thereby the high-pressure engine cooling water is discharged into the engine room ER. The safety valve $A_3$ functions at a pressure higher than those at which the safety valves $A_1$ and $A_2$ function.

Figure 6:
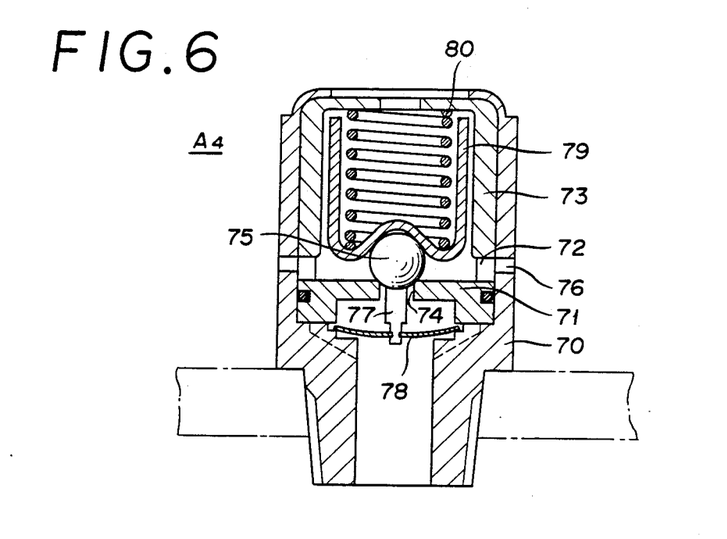

FIG. 6 illustrates a safety valve $A_4$ employed in a safety device, in a still another embodiment, according to the present invention. The safety valve $A_4$, similarly to the safety valves $A_1$ and $A_2$, functions in the shaded area in FIG. 3. The safety valve $A_4$ incorporates a bimetal 78 as the heat-responsive actuator t.

The safety valve $A_4$ has a casing 70 provided in the heater core circuit H, a partition wall 71 provided within the casing 70, and a cap 73 having through holes 72 at the lower end thereof and fitted in the casing 70 so as to be in contact at the lower end thereof with the partition wall 71. The upper end of the casing 70 is caulked to secure the partition wall 71 and the cap 73 in place. Normally, a through hole 74 formed in the partition wall 71 is shut by a valve element 75. The through holes 72 communicate with discharge holes 76 formed in the casing 70.

The bimetal formed of, for example, Ni, Gr and Fe is attached to the free end of the stem 77 of the valve element 75 is biased resiliently downward through a valve holder 79 by a coil spring 80. The valve element 73 is moved axially according to the mode of deformation of the bimetal 78.

When the temperature of the engine cooling water rises beyond a predetermined temperature Ta, the bimetal 78 warps in an upward convex shape to lift the valve element 75 through the valve stem 77 against the resilient force of the coil spring 80, and thereby the through hole 74 is opened to discharge the engine cooling water through the thorough holes 72 and the discharge holes 76 into the engine room ER.

When the pressure of the engine cooling water increases beyond a predetermined pressure Pa, the pressure of the engine cooling water directly acting on the valve element 75 opens the through hole 74 against the resilient force of the coil spring 80.

In the foregoing embodiments described with reference to FIGS. 2 to 6, the safety valves open to discharge the engine cooling water either when the temperature of the engine cooling water exceeds the predetermined temperature or when the pressure of the same exceeds the predetermined pressure. However, the present invention is not limited to those specific embodiments, but may be practiced in an embodiment employing a safety valve which functions only when the temperature of the engine cooling water exceeds a predetermined temperature. For example, it is possible that some portions having a comparatively low strength of the components forming the heater core circuit H are deteriorated by heat. Therefore, it is also important to provide a safety valve which functions only on the basis of the temperature of the engine cooling water directly related to the deterioration of such portion.

Figure 7:
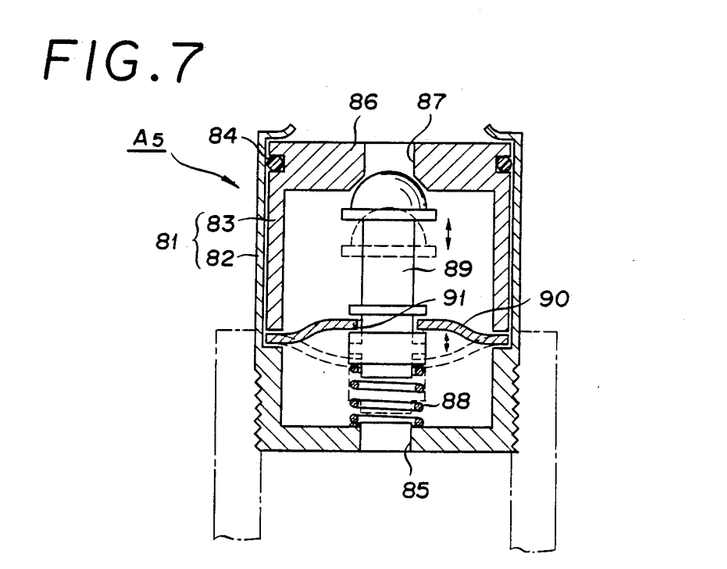
FIG. 7 is longitudinal sectional view of safety valve responsive to temperature variation employed in a still another embodiment of the present invention.
Figure 8:
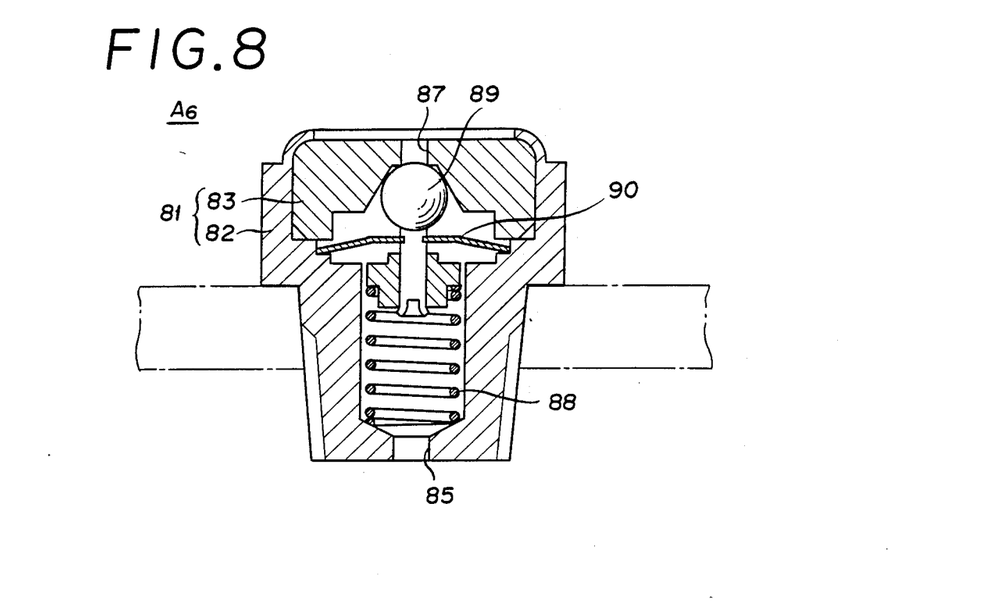
FIG. 8 is a longitudinal sectional view of a safety valve similar to the safety valve shown in FIG. 7.

FIGS. 7 and 8 illustrate safety valves which are responsive only to temperature variation.

A safety valve $A_5$ shown in FIG. 7 has a tubular casing 81 screwed on a member forming the flow passage of the engine cooling system. The tubular casing 81 comprises an outer tube 82 and an inner tube 83.

The inner tube 83 is fitted closely in the outer tube 82 so that the lower end thereof is located close to a shoulder formed in the inner circumference of the outer tube 82. An O-ring 84 is placed in a groove formed at the upper end in the outer circumference of the inner tube 83 to seal the interior of the tubular casing 81. An inlet opening 85 is formed in the bottom wall of the outer tube 82, and a discharge hole 87 is formed in the top wall of the inner tube 83. The upper end of the outer tube 82 is caulked, so that the inner tube 83 is held between the caulked portion and the inner shoulder of the outer tube 82 to hold the inner tube 83 in place within the outer tube 82.

A valve element 89 is pressed resiliently against the top wall of the inner tube 83 by a spring member 88 so as to shut the discharge hole 87. The valve element 89 is interlocked with a transformable plate 90, namely, the heat-responsive actuator t, which transforms to lower the valve element 89 so as to open the discharge hole 87 when the temperature of the engine cooling water exceeds a predetermined temperature. The transformable plate 90 is formed of a shape memory alloy and transforms against the resilient force of the spring member 88. The transformable plate 90 has a central opening and a plurality of through holes to allow the engine cooling water to flow across the transformable plate 90.

The transformable plate 90 is held along the periphery thereof between the inner shoulder of the outer tube 82 and the lower end of the inner tube 83. The inner circumference of the transformable plate 90 is received in a groove 91 formed in the lower end of the valve element 89.

When the temperature of the engine cooling water rises beyond a predetermined temperature Ta, the transformable plate 90 transforms as indicated by broken lines in FIG. 7 to pull down the valve element 89 against the resilient force of the spring member 88, whereby the discharge hole 87 is opened to discharge the engine cooling water of a high temperature and a high pressure through the discharge hole 87 outside the engine cooling system.

Figure 9:
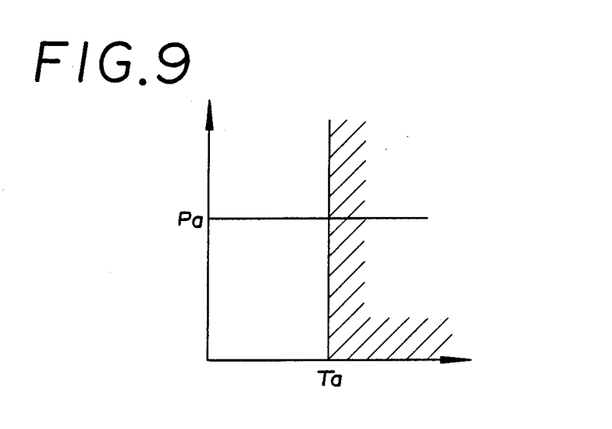
FIG. 9 is a diagram showing the operating ranges of the safety valves shown in FIGS. 7 and 8.

In this embodiment, the safety valve $A_5$ is responsive only to heat and operates on the basis of the temperature of the engine cooling water in the engine cooling system. Thus, the safety valve $A_5$ functions, in a shaded area in FIG. 9 where the temperature of the engine cooling water is higher than the predetermined temperature Ta without sensing the pressure of the engine cooling water.

A safety valve $A_6$ shown in FIG. 8, similarly to that shown in FIG. 7, is responsive only to heat and operates according to the temperature of the engine cooling water. The safety valve $A_6$ is substantially the same as the safety valve $A_5$ in configuration and function, except that the safety valve $A_6$ employs a bimetal 90 instead of the transformable plate 90 formed of a shape memory alloy. Hence the same parts are referred to by the same symbols and so that the detailed description thereof will be omitted.

Figure 10:
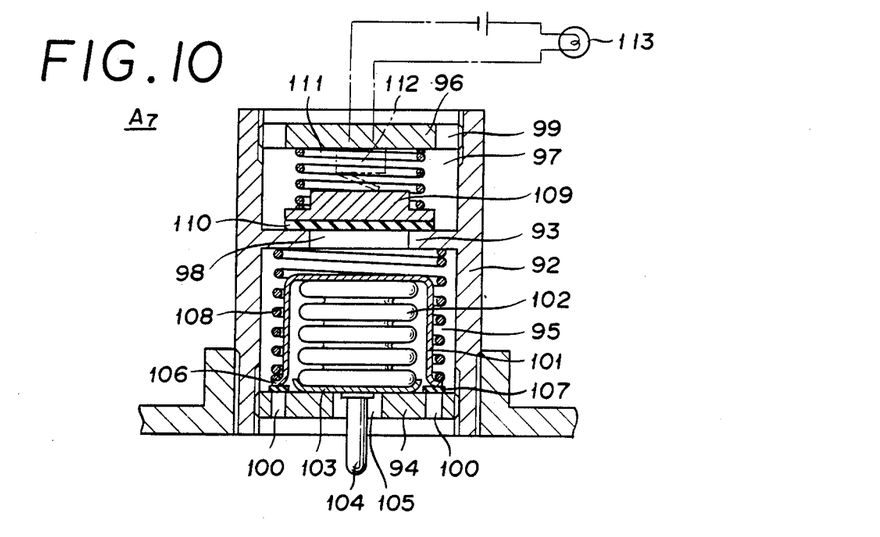
FIG. 10 is a longitudinal sectional view of a safety valve responsive to both temperature and pressure employed in a still another embodiment of the present invention.

A safety valve $A_7$ shown in FIG. 10 functions only when the temperature of the engine cooling water exceeds a predetermined temperature and when the pressure of the same exceeds a predetermined pressure.

Referring to FIG. 10, a first valve chamber 95 is defined by a central partition wall 93 and a lower cap 94, and a second valve chamber 97 is defined by the central partition wall 93 and an upper cap 96 within a casing 92. The central partition wall 93 separating the first valve chamber 95 and the second valve chamber 97 has a second through hole 98, and a discharge hole 99 is formed in the upper cap 96 to make the second valve chamber 97 communicate with the outside of the safety valve $A_7$. First through holes 100 are formed in the lower cap 94 located in the flow passage to make the first valve chamber 95 communicate with the flow passage. The upper cap 96 and the lower cap 94 are screwed in the upper and lower ends of the casing 92, respectively. The upper cap 96 and the lower cap 94 are turned so as to move axially to adjust the respective resilient forces of an upper coil spring 111 and a lower coil spring 108, respectively.

A first valve element, namely, a temperature valve element 101 having a U-shaped section, is provided in the first valve chamber 95 and a bellows 102 serving as the heat-responsive actuator t is provided in the temperature valve element 101 with an end plate 103 attached to the lower end thereof in contact with the lower cap 94. A hollow heat sensing element 104 formed integrally with the end plate 103 extends through a through hole 105 formed in the center of the lower cap 94 and projects into the flow passage. The interior of the heat sensing element 104 communicates with the interior of the bellows 102. A gas which expands when heated, for example, Freon ® gas, is sealed in the bellows 102 and the heat sensing element 104. Thus, the bellows 102 expands and contracts according to the variation of the volume of the gas with temperature.

A flange 106 is provided in lower end of the temperature valve element 101. A packing 107 for closing the first through holes 100 of the lower cap 94 is attached to the lower flange 106. A lower coil spring 108 is provided between the flange 106 and the partition wall 93 to bias the temperature valve element 101 resiliently in a direction to shut the first through holes 100 by the packing 107.

When the temperature of the engine cooling water flowing in contact with the heat sensing element 104 through the flow passage exceeds a predetermined temperature Ta, the bellows 102 is expanded by the gas sealed therein to shift the temperature valve element 101 against the resilient force of the lower coil spring 108 toward the partition wall 93, so that the first through holes 100 are opened.

A second valve element, namely, a pressure valve element 109, for shutting the second through hole 98 is provided in the second valve chamber 97. A packing 110 is attached to the pressure valve 109 so as to be in contact with the partition wall 93. An upper coil spring 111 for resiliently biasing the pressure valve element 109 in a direction to shut the second through hole 98 is disposed between the lower cap 96 and the pressure valve element 109.

When the pressure of the cooling water in the first valve chamber 95 exceeds a predetermined pressure Pa, the cooling water lifts up the pressure valve element 109, and then flows into the second valve chamber 97 and flows outside through the discharge hole 99.

As indicated by phantom lines in FIG. 10, a microswitch 112 is attached to the inner surface of the upper cap 96. When the pressure valve element 109 is lifted up, the microswitch 112 is actuated to light up an alarm lamp 113. The alarm lamp 113 may be substituted by an alarm buzzer.

In this embodiment, when the temperature of the cooling water in the flow passage rises beyond the predetermined temperature Ta (FIG. 11), the bellows is caused to expand by the thermal expansion of the gas sealed therein against the resilient force of the lower oil spring 108. Consequently, the temperature valve element 101 is lifted up to open the first through holes 100 to allow the cooling water flowing through the flow passage to flow through the first through holes 100 into the first valve chamber 95. When the pressure of the cooling water in the first valve chamber 95 increases beyond the predetermined pressure Pa as shown in FIG. 11, the cooling water lifts up the pressure valve element 109, and then flows through the second valve chamber 97 and flows outside through the discharge hole 99.

Figure 11:
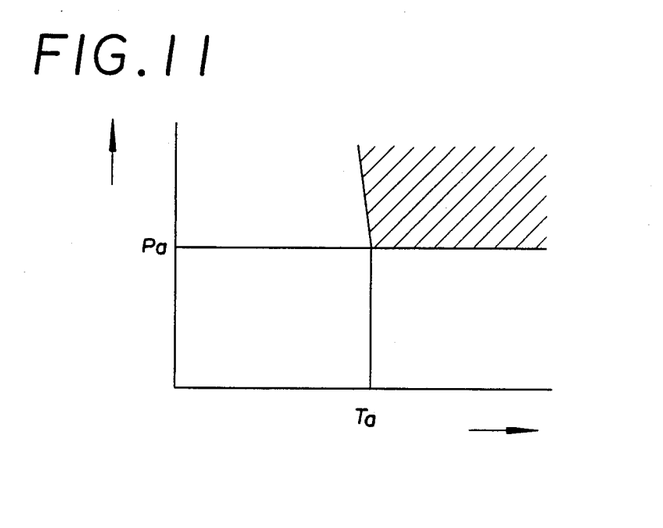
FIG. 11 is a diagram showing the operating range of the safety valve shown in FIG. 10.

Thus, the cooling water is discharged into the engine room ER when both the pressure and temperature of the cooling water are in a shaded area in FIG. 11. As is obvious from FIG. 11, the predetermined temperature Ta at which the temperature valve element 101 is lifted decreases as the pressure of the engine cooling water rises beyond the predetermined pressure Pa.

Figure 12:
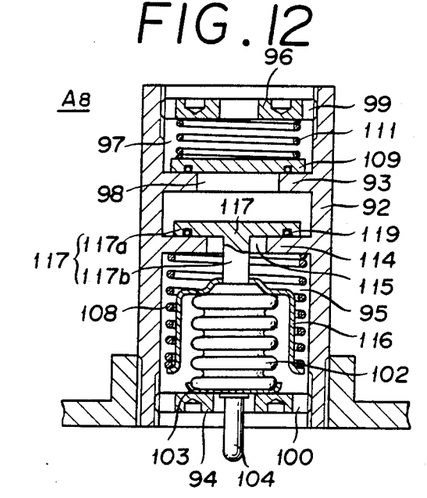
FIGS. 12 and 13 are longitudinal sectional views of safety valves similar to the safety valve shown in FIG. 10.

FIG. 12 illustrates a safety valve $A_8$ employed in a further embodiment of the present invention. The common elements with the above-mentioned embodiment shown in FIG. 11 are referred to by the same symbol. The safety valve $A_8$, similar to the above-mentioned safety valve $A_7$ has a partition wall 93 having a second through hole 98 in the central portion thereof and partitioning the interior of a casing 92 into a first valve chamber 95 and a second valve chamber 97. A valve seat 114 having a third central through hole 115 in the central portion thereof is provided in the first valve chamber 95. A temperature valve element 117 is attached to a valve body 116 of the same construction as that of the temperature valve element 101 of the safety valve $A_7$. The temperature valve element 117 consists of a disk portion 117a in contact with the upper surface of the valve seat 114, and a rod 117b extending downward from the center of the lower surface of the disk portion 117a and attached fixedly to the valve body 116. An annular packing 119 is provided on the lower surface of the disk portion 117a so as to be in contact with the valve seat 114.

When the engine cooling water is in the normal condition, the third through hole 115 formed in the valve seat 114 is shut to seal the first valve chamber 95 of the safety valve $A_8$, whereas the first through holes 100 are shut to seal the first valve chamber 95 of the safety valve $A_7$.

Figure 13:
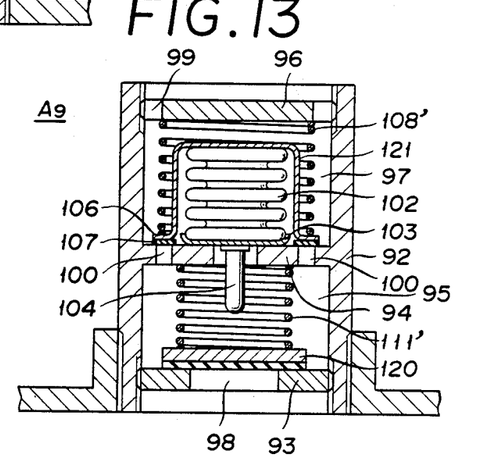

FIG. 13 illustrates a safety valve $A_9$ employed in a further embodiment of the present invention. The common elements with the embodiments shown in FIGS. 10 and 12 are referred to by the same symbol.

In the safety valve $A_9$, a first valve element 120 provided in a first valve chamber 95 is a pressure valve element, and a second valve element 121 provided in a second valve chamber 97 is a temperature valve element. Accordingly, a lower coil spring 111' provided in the first valve chamber 95 is similar to the upper coil springs 111 of the safety valves $A_7$ and $A_8$ and an upper coil spring 108' provided in the second valve chamber 97 is similar to the lower coil springs 108 of the safety valves $A_7$ and $A_8$. A heat sensing element 104 projects into the first valve chamber 95.

As apparent from what has been described hereinbefore, according to the present invention, a safety valve is provided in the heater core circuit of an engine cooling system. Therefore the engine cooling system is protected even if the radiator cap of the radiator circuit should fail to function properly, and there is no possibility that the heater core provided in the passengers' compartment is broken to flood the passengers' compartment even if the heater core has a weak construction.

Furthermore, when the safety valve is capable of functioning either when the temperature of the engine cooling water exceeds a predetermined temperature or when the pressure of the engine cooling water exceeds a predetermined pressure, the safety function of the safety valve covers a wide range of the condition of the engine cooling water. Such a capability of the safety valve is particularly effective when the engine cooling water contains an antifreeze, because such a safety valve is able to deal readily with the variation of the boiling point and mode of temperature rise of the engine cooling water attributable to the antifreeze contained in the engine cooling water.

Still further, a heater core having a weak construction subject to thermal deterioration can be protected by providing a safety valve which is responsive only to heat. Furthermore, since the ordinary radiator cap is responsive only to pressure, the safety valve responsive only to heat supplements the function of the radiator cap in respect of temperature, which further enhances the safety of the engine cooling system.

What is claimed:

1. A safety device for a closed engine cooling system having a heater core circuit including a cabin heater core for an automotive air conditioning system through which a portion of the engine cooling water from the engine is circulated, and a radiator circuit including a radiator positioned outside of a passenger compartment through which a remaining portion of the engine cooling water is circulated, said radiator having a radiator cap with a safety means for discharging the engine cooling water when the cooling water flowing in the radiator circuit exceeds a predetermined pressure level, comprising a safety valve positioned outside of the passenger compartment in a pipe of the heater core circuit that is capable of discharging the engine cooling water outside the passengers' compartment when the temperature of the engine cooling water exceeds a predetermined temperature and/or when the pressure of the engine cooling water exceeds a predetermined pressure.

2. A safety device as recited in claim 1, wherein said safety valve opens when the temperature of the engine cooling water exceeds a predetermined temperature or when the pressure of the engine cooling water exceeds a predetermined pressure.

3. A safety device as recited in claim 2, wherein said safety valve comprises:
   a bottomed tubular casing attached to a cooling water passage member having a flow passage through which the engine cooling water flows, having a partition wall having a through hole and partitioning the interior of said casing into a first chamber and a second chamber, and provided with a discharge hole formed in the side wall thereof so as to communicate with said second chamber;
   a valve element provided in said second chamber so as to open the through hole formed in said partition wall when the pressure of the engine cooling water exceeds a predetermined pressure; and
   a heat-responsive actuator provided in said first chamber and varying in shape according to the temperature of the engine cooling water flowing through the flow passage so as to lift the valve element.

4. A safety device as recited in claim 3, wherein said heat-responsive actuator is a bellows hermetically containing a gas which varies in volume according to heat.

5. A safety device as recited in claim 3, wherein said heat-responsive actuator comprises a tubular member hermetically containing a wax which varies in volume according to heat, and adapted to use the transformation of the wax for moving a rod for operating said valve element.

6. A safety device as recited in claim 1, wherein said safety valve opens when the temperature of the engine cooling water exceeds a predetermined temperature and the pressure of the engine cooling water exceeds a predetermined pressure.

7. A safety device as recited in claim 6, wherein said safety valve comprises:
   a casing attached to a cooling passage member forming a flow passage through which the engine cooling water flows, having a partition wall provided with a second through hole and partitioning the interior thereof into a first valve chamber on the side of the flow passage and a second valve chamber on the other side of the flow passage, and provided with a discharge hole formed in the side wall thereof so as to allow the second valve chamber to communicate with the exterior;
   a second valve element provided in the second valve chamber so as to open the second through hole when the pressure of the engine cooling water in the first valve chamber exceeds a predetermined pressure; and
   a first valve element provided in the first valve chamber so as to open a first through hole by means of which the flow passage communicates with the first valve chamber when the temperature of the engine cooling water flowing through the flow passage exceeds a predetermined temperature.

8. A safety device as recited in claim 6, wherein said safety valve comprises:
   a casing attached to a cooling water passage member forming a flow passage through which the engine cooling water flows, having a partition wall provided with a second through hole and partitioning the interior thereof into a first valve chamber on the side of the flow passage and a second valve chamber on the other side of the flow passage, and having a discharge hole allowing the second valve chamber to communicate with the exterior;
   a first valve element provided in the first valve chamber so as to open a first through hole by means of which the first valve chamber communicates with the flow passage when the pressure of the engine cooling water flowing through the flow passage exceeds a predetermined pressure; and
   a second valve element provided in the second valve chamber so as to open the second through hole when the temperature of the engine cooling water in the first valve chamber exceeds a predetermined temperature.

9. A safety device as recited in claim 1, wherein said safety valve opens when the temperature of the engine cooling water exceeds a predetermined temperature.

10. A safety device as recited in claim 9, wherein said safety valve comprises:
    a tubular casing attached to a cooling water passage member of an engine cooling system through which engine cooling water circulates, and having a discharge hole
    a valve element for shutting the discharge hole of said tubular casing;
    a spring member resiliently biasing said valve element in a direction to shut the discharge hole of said tubular casing; and
    a heat-responsive actuator for operating said valve element, said heat-responsive actuator being a transformable plate formed of a shape memory which transforms against the resilient force of said spring member when the temperature of the engine cooling water exceeds a predetermined temperature.

11. A safety device as recited in claim 10, wherein said transformable plate is a bimetal.

* * * * *